UNITED STATES PATENT OFFICE.

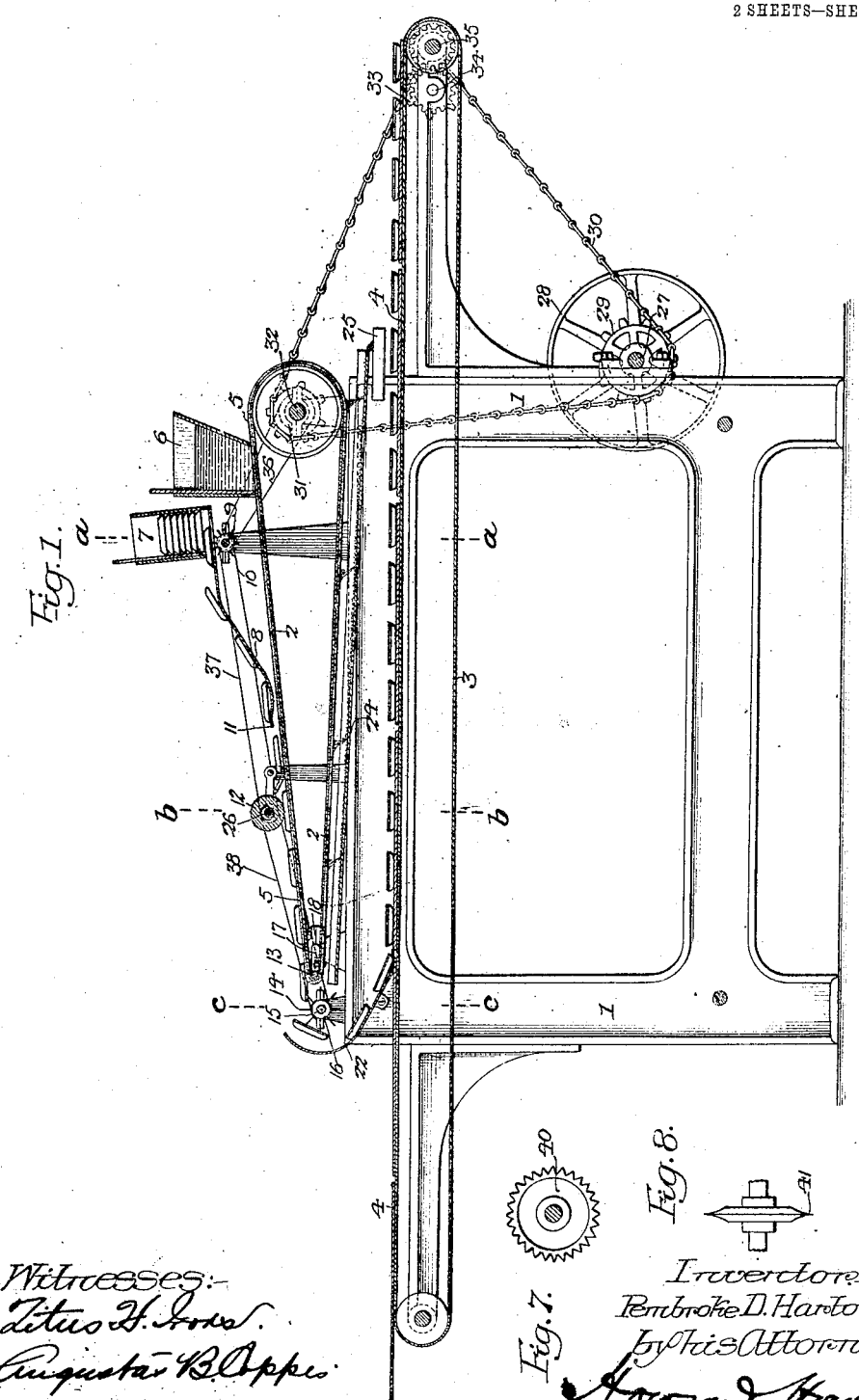

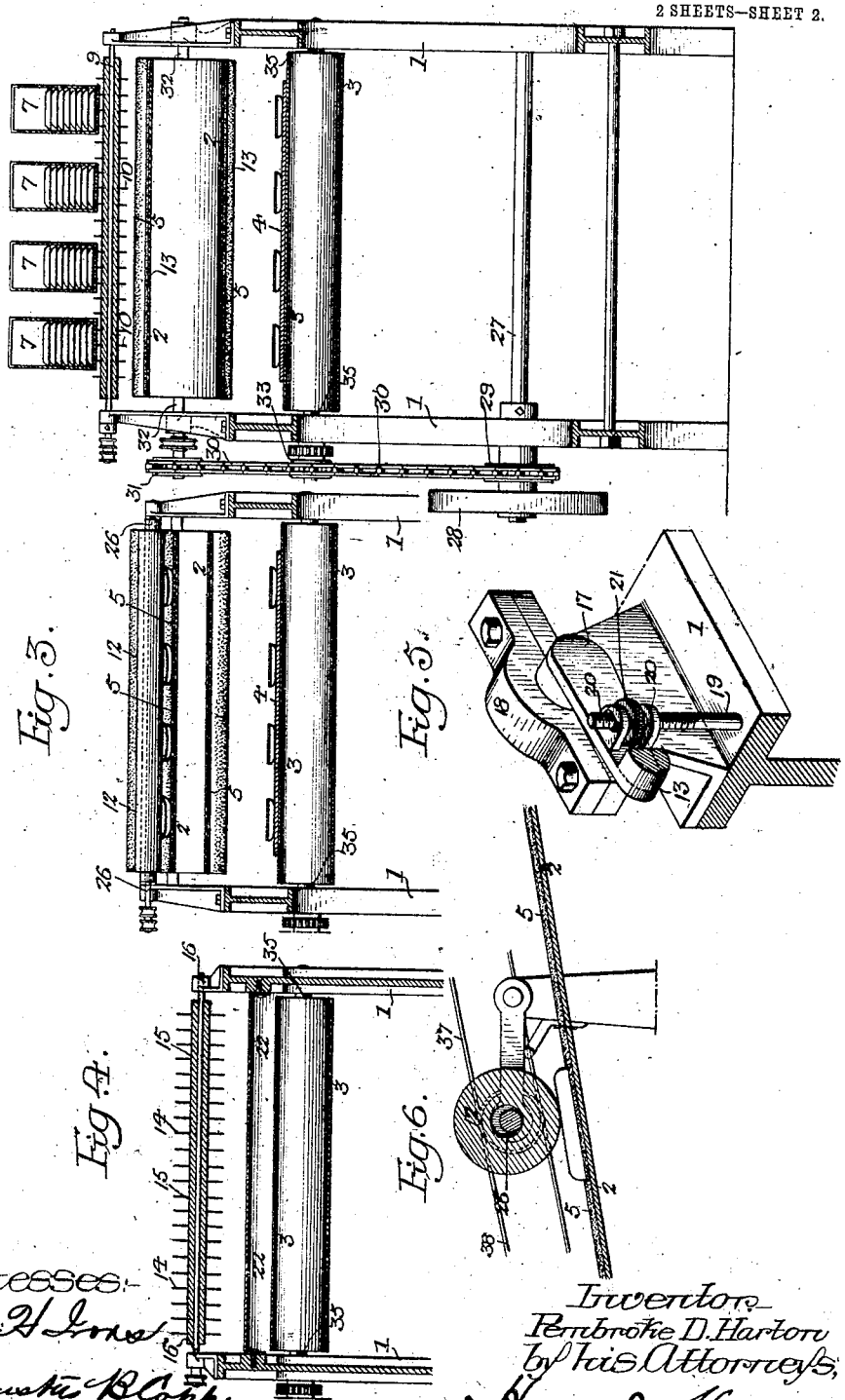

PEMBROKE D. HARTON, OF PHILADELPHIA, PENNSYLVANIA.

CAKE-COATING MACHINE.

No. 895,856.

Specification of Letters Patent.

Patented Aug. 11, 1908.

Application filed July 9, 1907. Serial No. 382,825.

*To all whom it may concern:*

Be it known that I, PEMBROKE D. HARTON, a citizen of the United States, residing in Philadelphia, Pennsylvania, have invented certain Improvements in Cake-Coating Machines, of which the following is a specification.

The object of my invention is to provide simple and efficient means for mechanically coating biscuits, cakes and other similar baked articles of relatively small size, with icing or with other similar material such as chocolate, marshmallow or the like.

The apparatus forming the subject of my invention is so constructed that there is no handling of the cakes from the time they are entered into a suitable delivery hopper until they are removed from the carrier ready for packaging.

My invention is fully shown in the accompanying drawings in which:

Figure 1, is a side elevation of a machine embodying my invention; Fig. 2, is a sectional view on the line $a$—$a$, Fig. 1; Fig. 3, is a sectional view on the line $b$—$b$, Fig. 1; Fig. 4, is a sectional view on the line $c$—$c$, Fig. 1; Fig. 5, is a perspective view of a detail of my invention; Fig. 6, is an enlarged view of part of the mechanism shown in Fig. 1, and Figs. 7 and 8, are views illustrating modified details of my invention.

The machine forming the subject of my invention consists of a suitable frame 1 above which is mounted suitable means for carrying a coating belt 2, which is traversed by suitable mechanism, and below said belt a traveling conveyer belt 3 upon which suitable receptacles 4 may be placed. The belt 2 is designed to receive coating material such as icing, chocolate, etc., which is indicated at 5, and this coating is distributed to the belt from a reservoir 6 suitably mounted, beneath which said belt passes. In front of said reservoir is a hopper, or a series of hoppers, 7, for cakes, biscuits and the like, and from the bottom of said hopper or hoppers a delivery chute 8 extends whereby the cakes may be delivered onto the coated belt 2.

To deliver cakes from the hopper or hoppers, I provide a roll 9 having radial pins 10 disposed throughout its length to engage said cakes; the roll being driven at a convenient rate of speed whereby the engagement of the pins will serve to carry from the hopper or hoppers the lowermost cakes within the same.

The hoppers are removable so that different sizes may be employed and their bottoms are slotted so as to permit movement of the pins past the same. The cakes pass over a slight rise 11 at the lower end of the delivery chute 8 whereby they may be dropped evenly onto the coating carried by the belt 2. As the cakes are carried forward by the belt they are engaged by a pressure roll 12 to insure proper and sufficient contact with the coating material and after leaving said pressure roll they are carried to a point for removal from said belt 2 and delivery to a suitable conveyer belt, such as indicated at 3. In order to discharge the cakes from the belt 2, the latter is given a sharp turn around a small bar 13, which is adjustably mounted, as clearly shown in Fig. 5, and as said cakes tend to pass beyond the edge formed by the sharp turn, they are engaged by pins 14 carried by a roller 15 journaled in suitable bearings 16 and driven in such relation to the belt 2 as to properly engage the cakes delivered by the same. The bar 13 is carried by arms 17 journaled in bearings 18, and threaded stems 19 carried by the frame 1 pass through slotted lugs 20 on said arms. Nuts 21 adapted to said stems lie between the lugs and by turning these nuts the arms may be adjusted up and down.

The cakes removed from the belt 2 by the means just described are delivered to an adjustable delivery chute 22 from which they are dropped onto boards or other receptacles 4 mounted on the conveyer belt 3 and from thence said cakes are delivered to suitable cooling chambers to set the coating upon the same. As the coated belt 2 will carry a certain excess of material I provide below the lowermost run of said belt a drip trough 24 into which said coating material may fall and said drip trough delivers to a drip box 25.

The pressure roller 12 is loosely mounted on its driving shaft 26 and since the latter is driven at a relatively high speed this roller will be given sufficient rotative movement to cause it to ride over the successive cakes, thereby pressing them into the coating on the belt without crushing their edges. The machine is provided with a suitable driving shaft 27 having a pulley 28 by which it is driven. Said shaft also carries a chain wheel 29, and a chain 30 extends from the same to a chain wheel 31 on a shaft 32 for driving the coating belt 2, and to a chain wheel 33 on a shaft 34 which is geared to a shaft 35 whereby the conveyer belt 3 may be driven. The roll 9 is driven by a belt 36 from the shaft 32; the shaft 26 is driven by a belt 37 from the roll 9, and the shaft 16 is driven by a belt 38 from the shaft 26. By the use of such driving mechanism, the several parts may be operated and the belts driven at proper relative speeds for the carriage of the several cakes in the coated and uncoated condition through said machine.

Although I have shown certain means for delivering the cakes to and from the coating belt and to and from the conveyer belt, I do not wish to be limited to any particular mechanism for accomplishing these objects. I may use a toothed wheel 40, as shown in Fig. 7, or a knife-edged wheel 41, as shown in Fig. 8, for this purpose.

I claim:

1. The combination of a coated belt, means for delivering cakes onto said belt, and rotating pickers for removing said cakes therefrom.

2. The combination of a coated belt, a cake reservoir, a chute leading from said reservoir, means for delivering the cakes in said reservoir to the chute for passage to the belt, and rotating pickers for removing the coated cakes from said belt.

3. The combination of a coated belt, means for delivering cakes thereto, rotating means for pressing said cakes into the coating material, and rotating pickers for removing the cakes from said belt.

4. The combination of a coated belt, means for delivering cakes thereto, a second belt, and rotating pickers for removing the cakes from the first belt and delivering them to the second belt.

5. The combination of a movable coated carrier, means for delivering cakes thereto, and rotating pickers for removing said cakes from the coated carrier.

6. The combination of a belt, means for delivering a coating material thereto, means for delivering cakes onto said coating material, and rotating pickers for removing said cakes therefrom.

7. The combination of a belt, means for coating the same, a cake reservoir, a chute leading from said reservoir, means for delivering the cakes in said reservoir to the chute for passage to the belt, and rotating pickers for removing the coated cakes from said belt.

8. The combination of a belt, means for delivering coating material thereto, means for delivering cakes thereto, rotating means for pressing said cakes into the coating material, and rotating pickers for removing the cakes from said belt.

9. The combination of a belt, means for coating the same, means for delivering cakes thereto, a second belt, and rotating pickers for removing the cakes from the first belt and delivering them to the second belt.

10. The combination of a movable coated carrier, means for delivering cakes thereto, rotating means for pressing said cakes into the coating, and rotating pickers for removing said cakes from the coated carrier.

11. The combination of a movable coated carrier, a cake hopper, and rotating pickers for delivering cakes from said hopper to the carrier.

12. The combination of a movable coated carrier, a cake hopper, and a rotating pin roller for delivering the cakes from said hopper.

13. The combination of a movable coated carrier, a cake hopper, a rotating roll, and pins carried by said roll for engagement with said cakes whereby they may be delivered onto the movable coated carrier.

14. The combination of a movable coated carrier, means for delivering cakes thereto, and a rotating pin roller for removing cakes therefrom.

15. The combination of a movable coated carrier, means for delivering cakes thereto, a rotating roll, and pins carried by said roll for engagement with said cakes whereby they may be removed from the coated carrier.

16. The combination of a belt, means for coating the same, means for driving said belt, an adjustable bar over which said belt is given a sharp turn whereby the cakes may be partially lifted therefrom, and rotating pickers for engaging the cakes as the belt makes such sharp turn.

17. The combination of a belt, a reservoir disposed above the same and beneath which the belt is traversed, said reservoir containing coating material for said belt, rotating pickers for delivering cakes to said coating, and rotating pickers for removing said cakes.

18. The combination of a coated carrier, means for delivering cakes thereto, a loosely mounted roller for pressing said cakes into the coating, and means for driving said roller.

19. The combination, in a cake coating machine, of a coated carrier, a cake hopper, and a pin roller for moving said cakes from the hopper to the carrier, the bottom of said hopper being constructed to permit passage of said pins.

20. The combination, in a cake coating machine, of a coated carrier adapted to receive cakes, and rollers having pins disposed over their surfaces for engaging said cakes to move them onto and from said carrier.

In testimony whereof, I have signed my name to this specification, in the presence of two subscribing witnesses.

PEMBROKE D. HARTON.

Witnesses:
 MURRAY C. BOYER,
 JOS. H. KLEIN.